United States Patent
Colligan

(10) Patent No.: US 6,385,711 B1
(45) Date of Patent: *May 7, 2002

(54) 1394 HARD DISK SECTOR FORMAT SELECTION

(75) Inventor: Tom Colligan, Austin, TX (US)

(73) Assignee: Dell Products, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,460

(22) Filed: Apr. 26, 1999

(51) Int. Cl.$^7$ ................................. G06F 12/00
(52) U.S. Cl. ................ 711/170; 707/205; 710/129; 711/170; 713/1; 714/6
(58) Field of Search ............... 711/170; 714/6; 713/1; 710/129; 707/205

(56) References Cited

U.S. PATENT DOCUMENTS

| | | | |
|---|---|---|---|
| 4,858,034 A | * 8/1989 | Hassel et al. | 360/51 |
| 5,072,378 A | * 12/1991 | Manka | 714/6 |
| 5,270,989 A | 12/1993 | Kimura | 369/37 |
| 5,471,381 A | 11/1995 | Khan | 364/148 |
| 5,504,757 A | 4/1996 | Cook et al. | 370/84 |
| 5,594,600 A | 1/1997 | Bruner et al. | 360/69 |
| 5,594,926 A | 1/1997 | Chang et al. | 395/872 |
| 5,706,439 A | 1/1998 | Parker | 395/200.17 |
| 5,761,520 A | * 6/1998 | Mase et al. | 712/1 |
| 5,835,299 A | 11/1998 | Lee et al. | 360/76 |
| 5,953,511 A | * 9/1999 | Sescila, III et al. | 710/129 |

* cited by examiner

Primary Examiner—Do Hyun Yoo
Assistant Examiner—Mehdi Namazi
(74) Attorney, Agent, or Firm—Skjerven Morrill MacPherson LLP

(57) ABSTRACT

A method, computer system and apparatus describe how a data transmission rate of incoming and outgoing data are correlated to the size of a data storage area of a medium by formatting the medium with the data storage area into a plurality of sectors according to the data transfer rate of the data. The medium is correlated to a data transmission rate of data by providing a controller to format the medium into a sector size according to a packet size associated with the data transfer rate of the data. The method includes providing a controller with a capability of determining a read/write transmission size, the read/write transmission size correlated to the data transmission rate and the sector size. The controller also has the capability of determining a read/write transmission size according to the formula: $R_{trans}=(R_{HD}, R_{data})_{max}$. The method includes formatting a hard disk drive, wherein the correlating the size of a data storage area on the hard disk drive with a data transfer rate includes correlating sector sizes of the hard disk drive according to a size of data packets to be transferred to the hard disk drive. The method includes providing an adaptive disk cache, the disk cache adaptively organizing the data into the size of the data storage area. The adaptive disk cache arranges the data for the data storage area such that a plurality of pending data requests can be reordered to complete the pending data requests efficiently.

24 Claims, 4 Drawing Sheets

1394 HARD DISK SECTOR FORMAT SELECTION

BACKGROUND OF THE INVENTION

1. Field of the Invention

The present invention relates to hard disk drives and formatting of hard disk drives, and more particularly, to the formatting of hard disk drives to receive data according to the packet size of an interface.

2. Description of the Related Art

Personal computer systems have attained widespread use. A personal computer system, such as a DELL® personal computer system, can usually be defined as a desktop or portable microcomputer that includes a system unit having a system processor or central processing unit (CPU) with associated memory, a display panel, a keyboard, a hard disk storage device or other type of storage media such as a floppy disk drive or a compact disk read only memory (CD ROM) drive. These personal computer systems are information handling systems which are designed primarily to give independent computing power to a single user or group of users.

A computer system user or computer system manufacturer must format the hard disk storage device for the device to be operable. Generally, formatting a hard disk drive involves low-level formatting, partitioning, and high-level formatting. Low-level formatting involves executing a program associated with the hard-disk controller card and supplying the controller with information concerning the hard disk drive. A hard disk drive may contain one or more disk platters with each disk platter formatted into tracks and sectors. The information transmitted to the controller includes the hard disk drive's number of sectors, and number of data bytes per sector. Typically, the number of tracks on a disk platter can vary from drive to drive, and the size of a sector is typically defined to hold 512 bytes of data.

A hard disk drive normally contains registers for receiving commands from the computer processor, and data registers for storing data to be retrieved by the processor. This interface between the hard disk drive and the processor follows the type of interface requirements of a given standard so that the hard disk drive can be attached to other computer components that also follow that standard. For example, an Advanced Technology Attachment (ATA) interface hard disk drive will follow the bus interface requirements defined in the American National Standards Institute (ANSI) ATA standard so that the hard disk drive can be attached to an Industry Standard Architecture (ISA) ATA bus.

When a specification is capable of transmitting a variety of data transmission rates, it is desirable to have a hard disk drive with the ability to take full advantage of the data transmission rates.

SUMMARY OF THE INVENTION

Accordingly, it has been discovered that the data transmission rate of incoming and outgoing data can be advantageously correlated to the size of a data storage area of a medium by formatting the medium with the data storage area into a plurality of sectors according to the data transfer rate of the data. More particularly, a medium can be correlated to a data transmission rate of data by providing a controller to format the medium into a sector size according to a packet size associated with the data transfer rate of the data.

More specifically, an embodiment of the present invention relates to a method of transmitting packet data to and from the medium according to the sector size. The method includes formatting the medium such that the sector size and the packet data size are substantially equivalent. Additionally, the method includes providing a controller with a capability of determining a read/write transmission size, the read/write transmission size correlated to the data transmission rate and the sector size. The controller also has the capability of determining a read/write transmission size according to the formula: $R_{trans}=(R_{HD}, R_{data})_{max}$ This formula provides that the transmission rate realizable by the hard disk drive is a maximum function wherein the transmission rate is the maximum of the rate of the hard disk drive or the data rate.

According to another embodiment of the present invention, a method includes formatting a hard disk drive, wherein the correlating the size of a data storage area on the hard disk drive with a data transfer rate includes correlating sector sizes of the hard disk drive according to a size of data packets to be transferred to the hard disk drive. The method includes providing information regarding the data storage area to a driver for the hard disk drive and providing at least one command indicative of information about the hard disk drive. Such information includes a size to which the data storage area is capable of receiving data. The method also includes providing a controller that receives and transmits the at least one command and installing an operating system capable of operating the driver.

Another embodiment of the present invention relates to a method of formatting a hard disk drive that includes providing an adaptive disk cache, the disk cache adaptively organizing the data into the size of the data storage area. The adaptive disk cache arranges the data for the data storage area such that a plurality of pending data requests can be reordered to complete the pending data requests efficiently.

Another embodiment of the present invention relates to a computer system that includes a processor, a memory coupled to the processor, a bus coupled to both the memory and the processor, a medium having a data storage area, the medium coupled to the bus, and a controller coupled to the bus, the controller capable of correlating the size of the data storage area on the medium with a data transfer rate. The computer system provides that the controller is capable of correlating the size of the data storage area to the data transfer rate for the data. Accordingly, the computer system includes means for determining a data storage capacity of the medium, the data storage capacity including a sector size, and means for formatting the medium into a plurality of sectors according to the data transfer rate of the data. The controller is capable of correlating the size of the data storage area by determining a data storage capacity of the medium, the data storage capacity including a sector size. The controller then formats the medium into a sector size according to a packet size associated with the data transfer rate of the data. The computer system also includes an adaptive cache with the medium, the adaptive cache storing the data on the medium depending on a packet data transfer rate. Accordingly, the controller correlates the size of the data storage area and transmits packet data to and from the medium according to the sector size. In one embodiment, the controller transmits packet data at a data transmission rate according to: $R_{trans}=(R_{HD}, R_{data})_{max}$.

Another embodiment of the present invention relates to an apparatus comprising a hard disk drive according to the IEEE 1394 Specification with a read and write head within the hard disk drive; a plurality of hard disk platters within the hard disk drive; an index mark placed on at least one of the plurality of hard disk platters; and a plurality of sector marks indicating a position of the read and write head, index mark and the plurality of sector marks indicating a position of the read and write head through a predetermined method at the start of each revolution. The predetermined method includes at least one of: rotational positioning sensing, triangular positioning and the Pythagorean theorem.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

There are a multitude of factors that affect the speed of a hard disk, both physical and nonphysical factors, including the rotation speed of the disk, the number of sectors per track, the physical seek and switch time of the disk, the rotational latency and access time, the cache allocated on the hard disk, the transfer rate for data, the organization of data on the disk, and the type of interface.

Types of interfaces for hard disks include SCSI, EIDE and 1394. Data is organized on a hard disk into cylinders, heads and sectors. Modern hard disks have sector sizes that can be changed and no longer have anything to do with the physical geometry of the hard drive. The hard disk generally calculates a logical block address for accessing data on the hard disk.

In a SCSI-2 type hard disk drive, the length in number of bytes for each logical block is the sector size used by the drive to format. A typical hard disk contains sectors holding 512 bytes of data. The number of sectors multiplied by the number of bytes held in each sector produces that amount of data the hard disk can hold.

Figure 1:
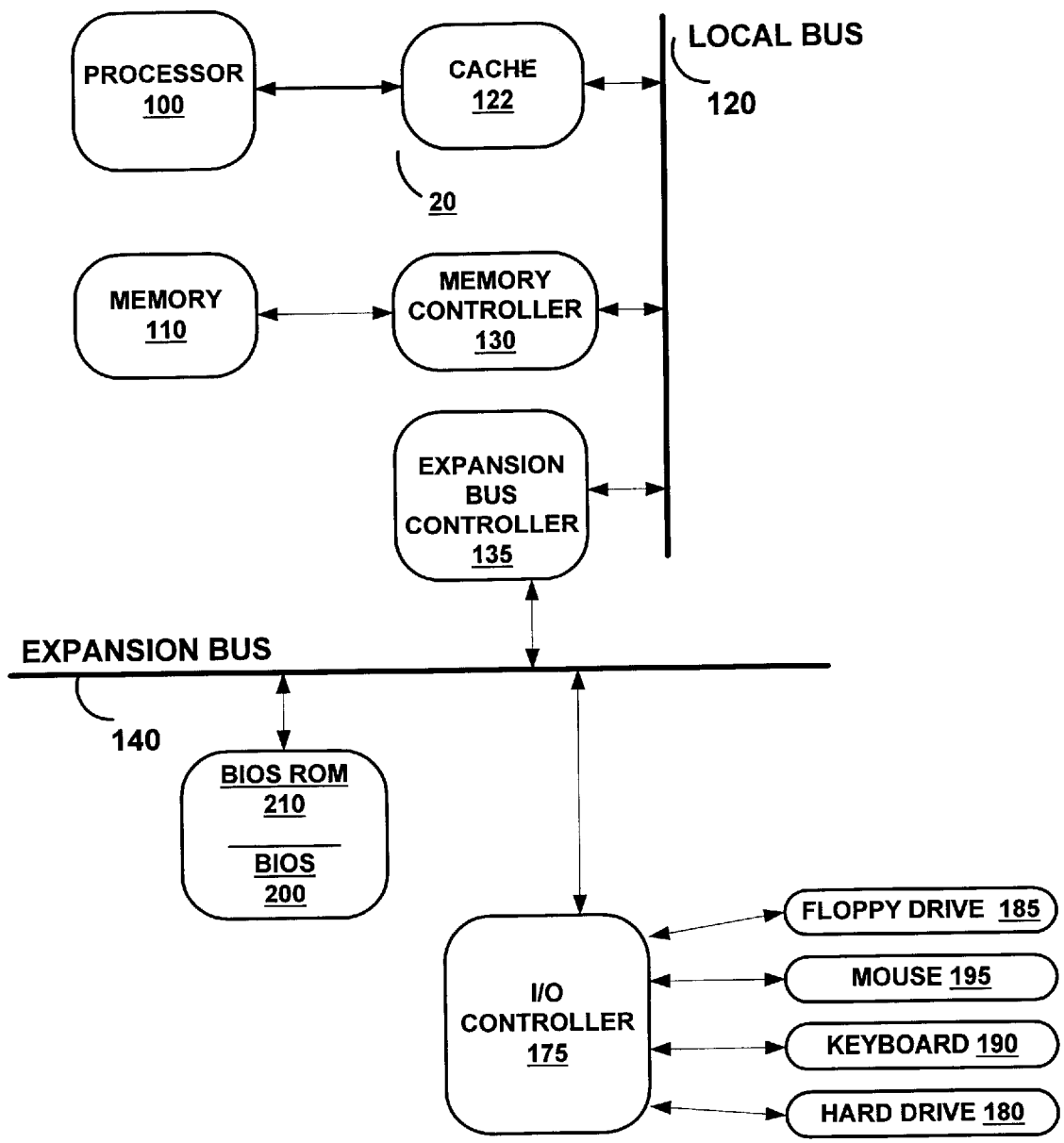
FIG. 1 shows a block diagram of one embodiment of a computer system according to the present invention.

Referring now to FIG. 1, a computer system 150 is shown consistent with an embodiment of the present invention that includes a processor 100, and a memory 110 coupled to the processor 100 via local bus 120. Processor 100 includes microprocessor 160, preferably a microprocessor such as an Intel Pentium® microprocessor, and may include coprocessor 115.

Local bus 120 includes conventional data, address and control lines conforming to, for example, the peripheral connect interface (PCI) architecture. Main system memory 110 may include dynamic random access memory (DRAM) modules coupled to local bus 120 by a memory controller 130. Main memory 110 stores application programs and data for execution by processor 100.

In operation, BIOS 200 is loaded from BIOS ROM 210 to system memory (not shown) and is executed from system memory. The operating system and application programs access BIOS 200 rather than directly manipulating I/O ports and control words of the specific hardware. BIOS 200 is accessed through an interface of software interrupts and contains a plurality of entry points corresponding to the different interrupts. In operation, BIOS 200 is loaded from BIOS ROM 210 to system memory 125 and is executed from system memory 125.

A bus interface controller or expansion bus controller 135 couples local bus 120 to an expansion bus 140, thereby coupling both the memory 110 and processor 100 to expansion bus 140. Expansion bus 140 is coupled to I/O controller 175 which is coupled to and controls the operation of output media and devices, including hard drive 180, floppy drive 185, keyboard 190 and mouse 195. Additionally, I/O controller 175 operates to control data transfer on the expansion bus 140. According to one embodiment of the present invention, the I/O controller 175 operates to correlate the size of a data storage area on a medium with a data transfer rate. When the data storage area is hard disk drive 180, I/O controller 175 determines the data storage capacity of the hard disk drive, including the maximum sector size of the hard disk drive. For example, the I/O controller 175 performs formatting of the hard disk drive, correlating the formatting to the data transfer rate of data received at the I/O controller 175. It will be appreciated that I/O controller 175 may be capable of correlating the size of other types of data storage areas other than hard disk drives.

Figure 2:
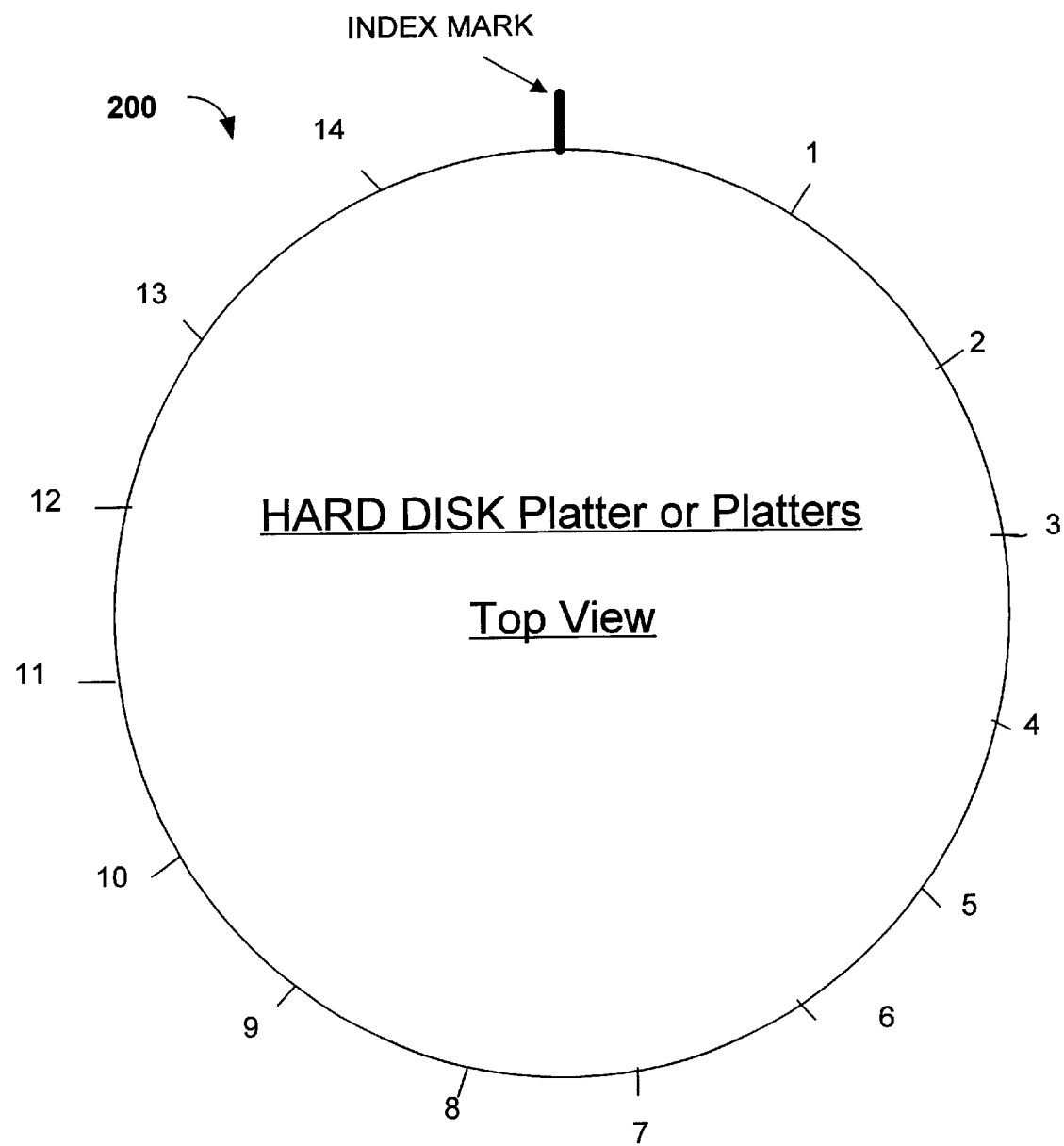
FIG. 2 shows a top view of a hard disk platter in accordance with the present invention.

Referring now to FIG. 2, a hard disk platter 200 is shown. FIG. 2 shows only the top view of the platter 200. Typically, both the top of the platter 200 and the bottom of the platter 200 are formatted to receive data. Referring to the top platter, 200 shows a plurality of sector numbers, 1–14 and an INDEX MARK. The hard disk platter 200 revolves in the hard disk drive and a hard disk drive Read/Write Head (not shown) reads and writes data to and from the hard disk platter 200. The INDEX MARK, also known as "pulse" mark is used to indicate the starting point for each revolution of the hard disk. The individual numbers, shown in FIG. 2 as numbers 1 through 14, are sector numbers, also known as "sector pulses". Using the INDEX MARK shown at the top of the hard disk platter 200, and the sector marks indicating a finer position, the exact position of the hard disk drive read/write head can be determined by using triangular positioning and the Pythagorean theorem at the start of each revolution. Another method of determining the exact position of the hard disk drive is through rotational positioning sensing.

According to one embodiment of the present invention, the information concerning the exact position of the hard disk drive read/write head, allows reordering of the reading and writing of sectors that are queued up, either in the hard disk drive cache or from an operating system queue. Accordingly, pending requests can be advantageously reordered to complete all pending tasks efficiently.

The standard Original Equipment Manufacturer (OEM) model provides that hard disk drives contain sectors sized to hold 512 bytes of data. However, certain hard disk drives, for example, the Barracuda 18LP Family of hard disk drives by Seagate™ allow users having the necessary equipment to modify the data block size and sector size by issuing a format command to obtain different formatted capacities. For example, the Barracuda 18LP Family allows users to select sector sizes from 512 to 4,096 bytes per sector in multiples of 2 bytes per sector.

The Barracuda family of hard disk drives supports the small computer system interface (SCSI) as described in the ANSI interface specifications. This type of drive is a high performance hard disk drive capable of data transmission rates of, for example, 3200 MBits/sec. Under SCSI specification, formatting a hard disk drive follows the particular SCSI protocol for direct access devices. SCSI-2 protocol, for example, provides for a MODE SENSE operation and a MODE PAGE wherein the sector size of the hard disk drive is determined. Typically, default values for sector size are hard coded in the firmware of the hard disk drive and stored in flash erasable programmable read only memory (EPROM) nonvolatile memory on the drive. Certain values in nonvolatile memory can be changed by a MODE SELECT command, wherein certain values concerning the sector size can be changed by changing a bit mask stored in the nonvolatile memory. These values can generally be changed by downloading new firmware into the flash EPROM.

The 1394 Specification, the so-called "Firewire™" Specification, is capable of data transmission rates of, for example 3200 Mbits/sec and sends information in the form of packets of data. Despite the fast data transmission rates, computer users lose the advantage of transmitting data at high speed due to several problems.

For example, an asynchronous transfer interface will demand transaction layer services from a bus manager, transaction layer services between an isochronous resource manager and the transaction layer, link layer services between the node controller and the link layer, and, finally, physical layer services between the node controller and the physical layer. Each service requirement adds command overhead to the data transmission packet. As the amount of data transmitted increases, so too does the amount of command overhead. This is unlike the data transmission for a typical IDE drive, wherein the amount of overhead is not related to the amount of data transmitted. For example, a transfer of one sector and a transfer of 256 sectors both require 6 bytes of command overhead, i.e., the same overhead regardless of the number of sectors.

Another problem associated with the 1394 specification is commonly described as "command overhead". Command overhead refers to the amount of overhead associated with each packet of data transmitted. For example, an asynchronous transfer interface will demand transaction layer services between a bus manager, transaction layer services between an isochronous resource manager and the transaction layer, link layer services between the node controller and the link layer, and, finally, physical layer services between the node controller and the physical layer. Each service requirement adds command overhead to the data transmission packet. As the amount of data transmitted increases, so too does the amount of command overhead. This is unlike the data transmission for a typical IDE drive, wherein the amount of overhead not related to the amount of data transmitted. For example, a transfer of one sector and a transfer of 256 sectors both require 6 bytes of command overhead, i.e., the same overhead regardless of the number of sectors.

Figure 3:
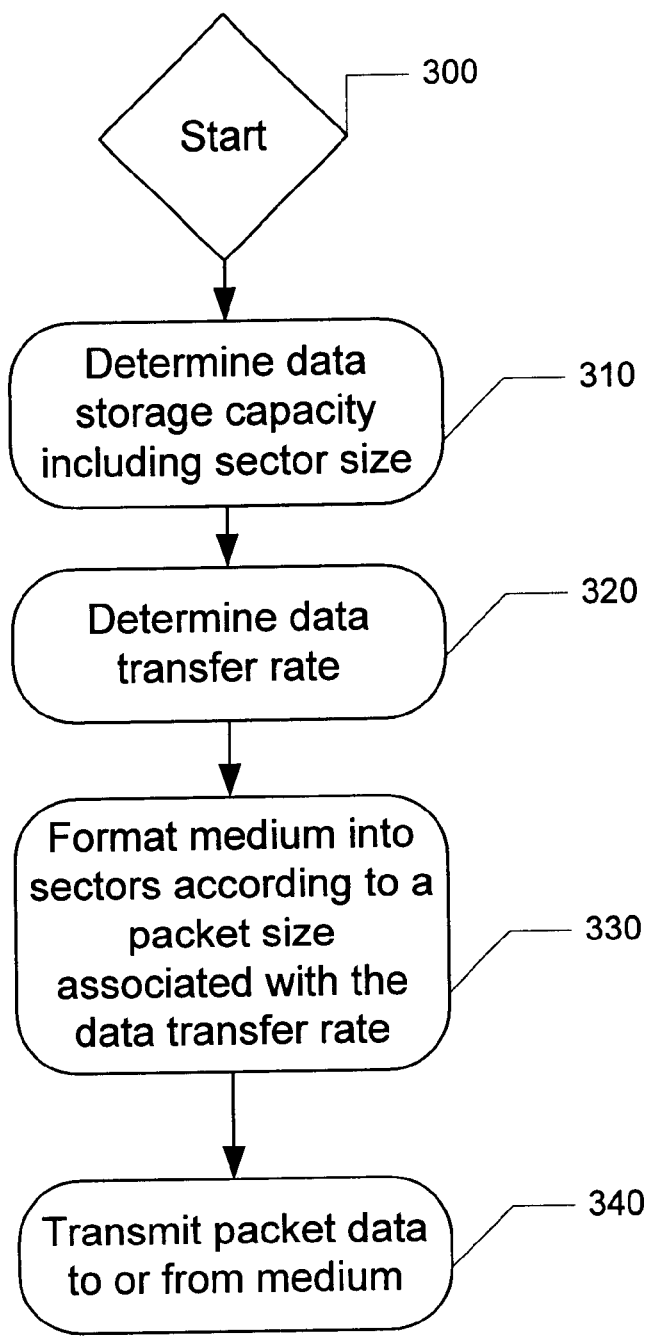
FIG. 3 shows a flow diagram of a method of storing and retrieving data on a storage medium in accordance with the present invention.

To use IEEE 1394 data transmission rates, embodiments of the present invention relate to formatting a medium, and more particularly, formatting the data storage area of a medium according to the data transfer rate of the data stored or retrieved from the medium. More particularly, an embodiment of the present invention describes formatting a hard disk drive into sectors according to the data transfer rate of the data. Referring now to FIG. 3, a method of formatting a medium is described. At step 310, the size of the data storage area is correlated to the data storage capacity of the medium. The data storage capacity of a hard disk drive, for example, includes a sector size. At step 320, the method provides for determining the data transfer rate. Step 330 of the method describes formatting the medium into a plurality of sectors according to the data transfer rate of the data. According to one embodiment of the invention, correlating the size of the data storage area includes determining the maximum sector size of a hard disk drive and providing a controller, wherein the controller performs the formatting of the hard disk drive according to a packet size associated with the data transfer rate of the data. Referring to FIG. 1 and FIG. 3 in combination, one of ordinary skill in the art will appreciate that I/O controller 175 could perform the formatting function of step 330, or, in the alternative, a controller within hard drive 180 could perform the formatting function of step 330. In one embodiment, I/O controller 175 or the controller within hard drive 180 has the capability of determining a read/write transmission size, the read/write transmission size correlated to the data transmission rate and the sector size. According to another embodiment of the invention, instead of the controller performing the formatting of the hard disk drive, the hard disk drive itself performs the formatting of the hard disk drive using internal components. Finally, at step 240, the data is transmitted to or from the medium at the maximum data transmittal rate allowable. This rate may be determined according to the formula: $R_{trans} = (R_{HD}, R_{data})_{max}$.

According to one embodiment, step 330 includes providing an adaptive cache within either the hard drive itself or within I/O controller 175. The adaptive cache stores the data on the hard drive 180 according to the data transfer rate. For example, with reference to the IEEE 1394 specification, storing the data on the drive correlates to the packet data transfer rate by transmitting packet data to and from the hard disk drive according to the sector size of the hard disk drive that was previously formatted according to the maximum transfer rate that the hard disk drive could handle. Ideally, the sector size and the packet data size are substantially equivalent.

According to another embodiment of the present invention, step 310 of method includes providing information regarding the data storage area to a driver for the medium, the providing of information including providing at least one command indicative of information including a size to which the data storage area is capable of receiving data. According to this embodiment, a controller receives and transmits at least one format command and installs an operating system capable of operating the driver. This embodiment further includes providing an adaptive disk cache, the disk cache adaptively organizing the data into a predetermined size for the data storage area.

Figure 4:
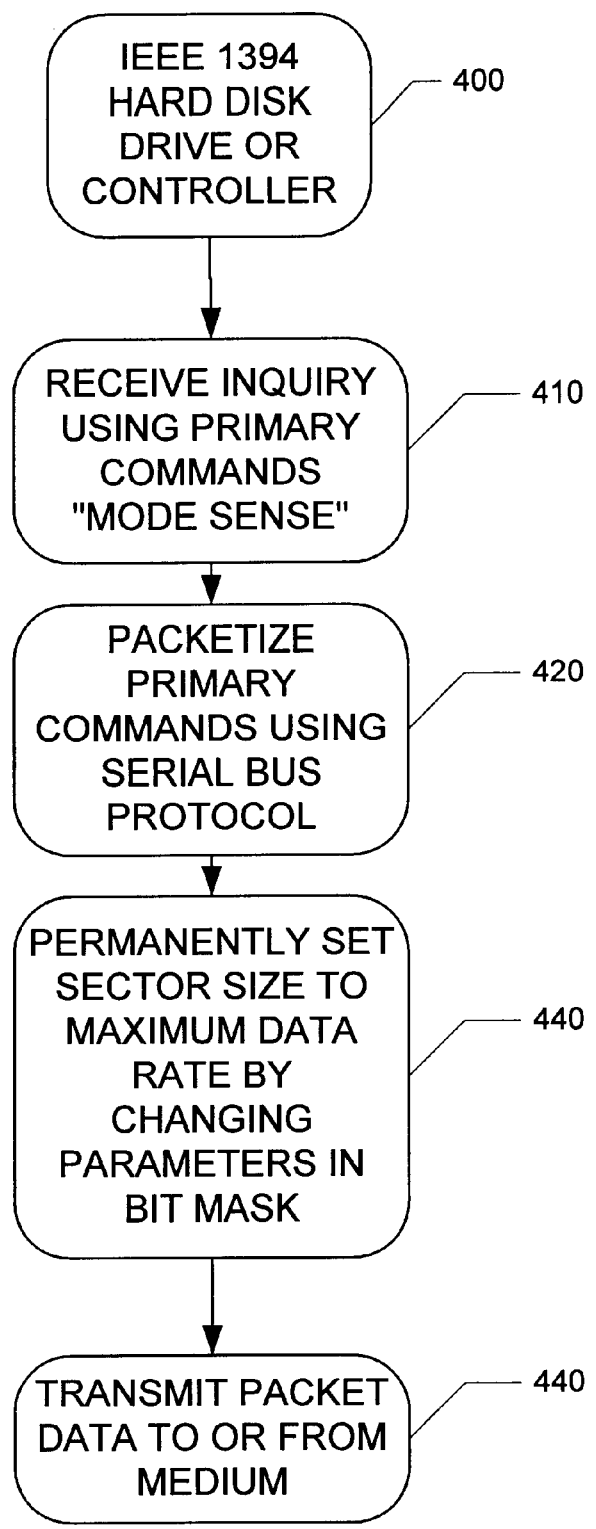
FIG. 4 shows a flow diagram of method for transmitting packet data to sectors of a hard disk drive according to the data rate of the packet data.

Referring now to FIG. 4, a more specific method of providing information regarding the medium and formatting the medium is described. In this embodiment, a method is described that applies techniques described in a SCSI protocol to IEEE 1394 hard disk drives and applicable IEEE 1394 hard disk controllers. More particularly, the commands described in the Serial Bus Protocol 2 (SBP-2) as specified by IEEE Standard 1394-1995 fail to provide a protocol enabling an IEEE 1394 hard disk drive to take advantage of the high data transmission rates possible under the IEEE 1394 Specification. The method herein described applies specific commands and modifications of the ANSI SCSI, SCSI-2 and SCSI-3 (Fast-20 and Fast-40) interface specifications to the protocol of the IEEE 1394 Specification. The combination of the SBP-2 and ANSI SCSI produces a modified IEEE 1394 Specification by providing a modified asynchronous transport layer that takes advantage of the high data transmission rates under IEEE 1394.

According to the IEEE 1394 Specification, asynchronous transactions follow a protocol including a physical layer, a link layer, a transaction layer and an application layer. Incorporating the packetizing commands of the SCSI and SBP-2 specification into the IEEE 1394 Specification requires modifying the IEEE 1394 Specification. More specifically, an appropriate change to the IEEE 1394 Specification governing asynchronous transactions includes modifying the transaction layer to include extra transaction layer services covering packetization of data requests, wherein the requests include commands to format the hard disk according to the data transmission rate. The transaction layer of the IEEE 1394 Specification includes software calls to low level routines that insulate a computer user or programmer from a programming interface associated with the link layer. Additionally, the transaction layer provides a verification procedure for packet delivery and initiates acknowledgment of packets. Additionally, because asynchronous packets must be constructed at the link layer, one embodiment of the present invention includes modifications to the IEEE 1394 link layer to account for the new transaction type and different packet contents.

Referring now to step 410, the hard disk drive or controller identified at step 400 receives an inquiry requesting that the hard disk drive or controller provide information regarding the data storage area and provide the information to a driver. A command from the SCSI-2 specification, i.e., the MODE SENSE command described above, accomplishes this task by reading the MODE PAGE firmware of the hard disk drive. The MODE PAGE of the hard disk drive provides a separate configuration page stored in the EPROM. The SCSI-2 MODE SENSE command provides drive specifics to the driver and allows a user to first find out the maximum size to which the sectors may be set. The SCSI-2 MODE SELECT command allows a user to change the values in the EPROM according to the sector size desired. Prior to sending either the MODE SENSE or the MODE SELECT commands, the commands must be packetized according to the IEEE 1394 Specification and downloaded as new firmware, e.g. bit masks, into the flash EPROM.

Step 420 provides for packetizing the primary commands using the Serial Bus Protocol, such as SBP-2 protocol, and the IEEE 1394 Specification.

Step 430 describes the step of permanently setting the sector size of the hard disk drive to the maximum data transfer rate by changing the parameters of the bit mask. More specifically, step 430 requires changing the EPROM associated with the hard disk drive by installing new firmware. However, prior to transfer, the data will include the SCSI-type commands described above. Accordingly, changes to the data necessitates a new type of data structure. One type of data structure capable for transfer under this modified system includes the operation request block (ORB) structure described in the SBP-2 protocol. Under the SBP-2 protocol there are several different formats for ORBs whose uses include acquiring or releasing target resources, managing task sets and transport commands, such as command block requests. ORBs also provide, for the transfer commands, the address of a data buffer for the command. Applying the ORB structure to the present invention, the ORB is capable of providing a transport command to an IEEE 1394 hard disk drive with the address of a data buffer or hard disk drive cache.

Step 440 describes the step of permanently setting the sector size of the hard disk drive to the maximum data transfer rate by changing the parameters of the bit mask. More specifically, step 440 requires changing the EPROM associated with the hard disk drive by installing new firmware. This requires changing the MODE SELECT parameters. The SCSI-2 interface, for example, provides for a Mode Select Parameter List that includes a bit mask for providing the block length of a hard disk drive sector. Bytes 5, 6 and 7 are dedicated to providing a block length. When each bit is enabled, the size of the sector is 4096 bytes/sector. Under one embodiment of the present invention, byte 4 of the Mode Select Parameter list is also enabled to allow for a larger sector size of 16384 bytes when the 1394 packet size is 16384 bytes.

The table below illustrates the different sector sizes to which the hard disk drive could be formatted according to the data transfer rate:

| 1394 Bit Rate | 1394 Packet Size and Sector Size |
| --- | --- |
| 100 M bits/sec | 512 bytes |
| 200 M bits/sec | 1024 bytes |
| 400 M bits/sec | 2048 bytes |
| 800 M bits/sec | 4096 bytes |
| 1600 M bits/sec | 8192 bytes |
| 3200 M bits/sec | 16384 bytes |

After setting the sector size of the hard disk drive to the data transmission rate, step 440 provides for transmitting packet data to or from the hard disk drive.

According to one embodiment of the present invention, step 440 includes providing an adaptive hard disk drive cache that is capable of arranging the reading and or writing of the sectors that are queued such that the pending requests can be reordered to complete all pending tasks efficiently. This embodiment allows a hard disk drive formatted for a lower number of bytes, for example 512 bytes, to rearrange queued sectors so that a request at a higher data transmission rate, for example, a rate of 200 M bits/sec will receive data in packet sizes of 1024 bytes. Thus, the hard disk drive, although formatted at a lower sector size, appears to the controller as a hard disk drive formatted with a higher sector size, i.e., a virtual hard disk sector size.

Although particular embodiments of the present invention have been shown and described, it will be obvious to those skilled in the art that, based upon the teachings herein, changes and modifications may be made without departing from the embodiments of this invention and its broader aspects. Therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim and, in the absence of such recitation, no such limitation is present. For a non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements.

What is claimed is:

1. A method of formatting a hard disk drive capable of data storage of data, the method comprising:

determining a data storage capacity of a hard disk drive, the data storage capacity including a sector size; and formatting the hard disk drive into a plurality of sectors by setting the sector size of each of the plurality of sectors to a value substantially equivalent to a packet size associated with a data transfer rate of the data, wherein the data transfer rate of the data is associated with a data transfer protocol.

2. The method of claim 1, wherein the formatting the hard disk drive includes providing a controller to perform the formatting the hard disk drive step.

3. The method of claim 1, wherein the formatting the hard disk drive includes:

providing an adaptive cache, the adaptive cache storing the data on the hard disk drive depending on a packet data transfer rate.

4. The method of claim 3, wherein the adaptive cache arranges the reading and writing of a plurality of sectors to provide a virtual hard disk sector size, the virtual hard disk sector size correlated to the packet data transfer rate.

5. The method of claim 2, wherein the formatting the hard disk drive includes:

transmitting packet data to the hard disk drive according to the sector size; and transmitting packet data from the hard disk drive according to the sector size.

6. The method of claim 2, wherein the sector size and the packet data size are substantially equivalent.

7. The method of claim 2, further includes:

providing the controller with a capability of determining a read/write transmission size, the read/write transmission size correlated to the data transmission rate and the sector size.

8. The method of claim 7 wherein providing the controller with the capability of determining a read/write transmission size further includes:

providing for a data transmission rate according to $R_{trans}=(R_{HD}, R_{data})_{max}$.

9. The method of claim 1, wherein the substantially equivalent value includes correlating a size of at least one sector of a hard disk drive according to a size of at least one data packet to be transferred to the hard disk drive.

10. The method of claim 1, further comprising:

providing information regarding the data storage area to a driver for the hard disk drive, the providing of information including:

providing at least one format command indicative of information including a size to which the data storage area is capable of receiving data;

providing a controller that receives and transmits the at least one format command; and installing an operating system capable of operating the driver.

11. The method of claim 1, further comprising:

providing an adaptive disk cache, the disk cache adaptively organizing the data into the size of the data storage area.

12. The method of claim 11 wherein the disk cache arranges the data for the data storage area such that a plurality of pending data requests can be reordered to complete the pending data requests.

13. The method of claim 12 wherein the data storage area includes read and write sectors of a hard disk drive.

14. The method of claim 11 wherein the data is received as packets defined under a protocol, the protocol selected from a group including an IEEE 1394 Serial Bus Standard.

15. The method of claim 1, wherein the data transfer protocol is the IEEE 1394 Serial Bus Standard.

16. A computer system comprising:

a processor;

a memory coupled to the processor;

a hard disk drive having a data storage area, the hard disk drive coupled to a bus; and a controller coupled to the bus, the controller capable of correlating a size of the data storage area on the hard disk drive, wherein the controller determines a data storage capacity of a hard disk drive, the data storage capacity including a sector size, and wherein the controller formats the hard disk drive into a plurality of sectors by setting the sector size of each of the plurality of sectors to a value substantially equivalent to a packet size associated with a data transfer rate of the data, wherein the data transfer rate of the data is associated with a data transfer protocol.

17. The computer system of claim 16, wherein the controller capable of correlating the size of the data storage area includes:

means for determining a data storage capacity of the hard disk drive, the data storage capacity including a sector size; and means for formatting the hard disk drive into a plurality of sectors according to the data transfer rate of the data.

18. The computer system of claim 16, wherein the hard disk drive provides an adaptive cache, the adaptive cache storing the data on the hard disk drive depending on a packet data transfer rate.

19. The computer system of claim 18, wherein the adaptive cache arranges the reading and writing of a plurality of sectors to provide a virtual hard disk sector size.

20. The computer system of claim 18, wherein the adaptive cache arranges the data for the data storage area such that a plurality of pending data requests can be reordered to complete the pending data requests.

21. The computer system of claim 16, wherein:

the controller correlating the size of the data storage area transmits packet data to and from the hard disk drive according to the sector size.

22. The computer system of claim 21 wherein:

the controller transmits packet data at a data transmission rate according to: $R_{trans}=(R_{HD}, R_{data})_{max}$.

23. The computer system of claim 16, wherein the controller is in a hard disk drive.

24. The computer system of claim 16, wherein the data transfer protocol is the IEEE 1394 Serial Bus Standard.

* * * * *